A. C. NORCROSS.
REGULATOR FOR HOT-AIR FURNACES.
No. 7,638. Reissued April 24, 1877.
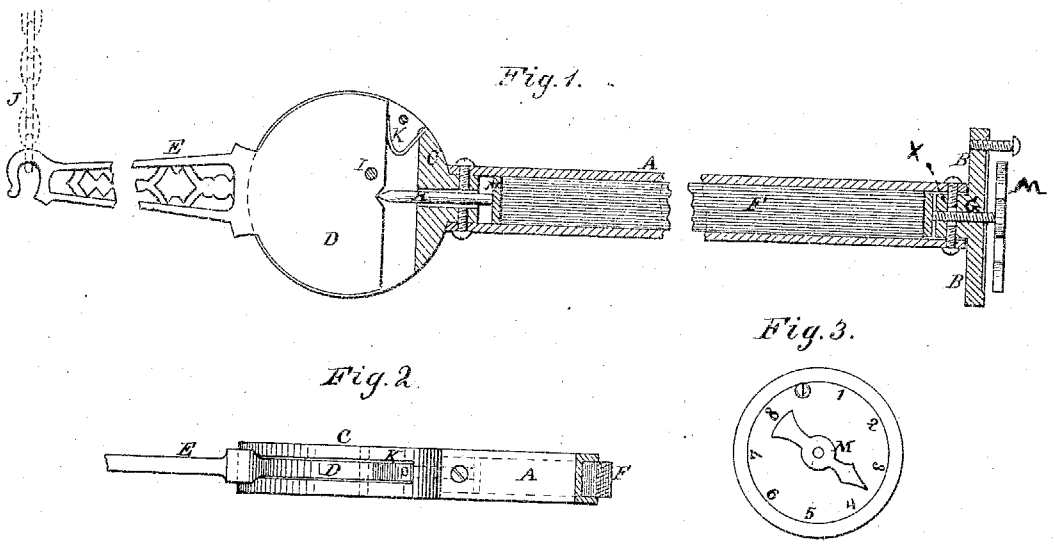
WITNESSES
Henry W. Miller
Manu Galt
INVENTOR
A. C. Norcross,
Alexander Strasser
ATTORNEYS

UNITED STATES PATENT OFFICE.

ALVIN C. NORCROSS, OF BOSTON, MASSACHUSETTS.

IMPROVEMENT IN REGULATORS FOR HOT-AIR FURNACES.

Specification forming part of Letters Patent No. 148,132, dated March 3, 1874; reissue No. 7,638, dated April 24, 1877; application filed April 17, 1877.

*To all whom it may concern:*

Be it known that I, ALVIN C. NORCROSS, of Boston, in the county of Suffolk and State of Massachusetts, have invented certain new and useful Improvements in Governor or Regulator for Hot-Air Furnaces; and I do hereby declare that the following is a full, clear, and exact description thereof, reference being had to the accompanying drawings, and to the letters of reference marked thereon, which form a part of this specification.

My invention relates to devices for automatically controlling the heat in a hot-air furnace or other heating device; and it consists in an outer expansible tube or shell, a bar or rod of less expansibility inclosed therein, a lever pivoted in a head and used in connection with said inner bar and tube, whereby the heat is automatically controlled, and also in the combination of devices as will be hereinafter more fully set forth.

In order to enable others skilled in the art to which my invention appertains to make and use the same, I will now proceed to describe its construction and operation, referring to the annexed drawing, in which—

Figure 1 is a side elevation, partly in section; Fig. 2, a plan view, and Fig. 3 a front elevation, of my invention.

A represents an expansible hollow bar or tube of any suitable dimensions, which acts through a head, C, and by means of an end-pointed rod, H, on a lever, D, pivoted at I, to operate the furnace-damper.

The head C may be provided with a spring, K, that acts on a different side of the fulcrum of the lever D, and tends to open the damper to the prescribed limit.

Within the hollow expansible bar or tube A is placed a rod or bar, F, of less expansibility, so as to bear directly on the rod H or upon an intermediate plate, N, and at the other end is inserted a base-piece, B, on which is a dial, and on the same is centered an adjusting-screw, G, having a pointer-head, M.

The expander A, being made in tubular form, is very sensitive to heat and cold, much more so than if the same amount of metal were used in the form of a solid bar or rod, and it acts to close the damper more and more as the heat intensifies. As the heat is made to decrease by the closing of the damper, the governor again opens the damper, and in this manner the heat can be under perfect control automatically to any degree desired.

This can be easily adjusted by means of the adjusting-screw G passing through a threaded opening or nut, X, and the degree of adjustment seen on the dial-plate. After the operator has set or adjusted the device to any desired degree, the heat when once raised to such degree will automatically maintain itself at the same as long as there is sufficient fuel in the furnace. By arranging a rod and tube in this way it will be seen that I make the action more positive by doing away with the usual amount of lost motion, caused by the different parts springing or giving, and detracting more or less from the the actual motion of the expander, which will correspond with the amount of power required to do the work.

Having thus fully described my invention, what I claim as new, and desire to secure by Letters Patent, is—

1. In an automatic heat-regulator, an outer expansible tube or shell, a bar of less expansibility inclosed therein, and a lever pivoted in a head, C, in connection with said inner bar and tube for automatically-controlling the heat in a furnace or other heating device, substantially as set forth.

2. The combination of the expansible tube A, rod H, lever D, the interior bar F, of less expansibility, and the adjusting-screw G, and nut or threaded opening, X, substantially as and for the purposes herein set forth.

3. In an automatic heat-regulator, having an outer expansible tube, an interior bar of less expansibility, and a lever, a dial, and adjusting-pointer combined therewith, substantially for the purposes herein set forth.

4. The combination, with expander A, rod H, and lever D, of the non-expansible bar F, pointer-headed screw G M, and dial-base B, as and for the purpose described.

5. The head C, having a lever, D, in combination with the tube A, rod F, and adjusting-screw and pointer M G, all substantially as and for the purposes herein set forth.

In testimony that I claim the foregoing I have hereunto set my hand this 16th day of April, 1877.

A. C. NORCROSS.

Witnesses:
FRANK GALT,
J. M. MASON.